US006115961A

United States Patent [19]

[11] Patent Number: 6,115,961

[45] Date of Patent: Sep. 12, 2000

Shea

[54] FLOWER POT COVER, FLOWER POT AND METHOD FOR MANUFACTURE OF THE SAME

[75] Inventor: Scott Shea, Berwick, Pa.

[73] Assignee: Berwick Industries, Inc., Berwick, Pa.

[21] Appl. No.: 08/656,376

[22] Filed: May 31, 1996

[51] Int. Cl.[7] .................... A01G 9/02

[52] U.S. Cl. .................... 47/72

[58] Field of Search .................... 47/72, 901; 29/469.5, 29/505; 229/1.5 B, 400, 404; D11/143, 164

[56] References Cited

U.S. PATENT DOCUMENTS

| | | |
|---|---|---|
| D. 123,110 | 10/1940 | Koch . |
| D. 266,796 | 11/1982 | Haslbeck . |
| D. 268,301 | 3/1983 | Haslbeck . |
| D. 279,279 | 6/1985 | Wagner . |
| D. 287,950 | 1/1987 | Weder et al. . |
| D. 289,024 | 3/1987 | Vaughn . |
| D. 289,982 | 5/1987 | Weder et al. . |
| D. 292,182 | 10/1987 | Weder et al. . |
| D. 292,183 | 10/1987 | Weder et al. . |
| D. 292,184 | 10/1987 | Weder et al. . |
| D. 292,185 | 10/1987 | Weder et al. . |
| D. 292,186 | 10/1987 | Weder et al. . |
| D. 292,187 | 10/1987 | Weder et al. . |
| D. 292,188 | 10/1987 | Weder et al. . |
| D. 292,189 | 10/1987 | Weder et al. . |
| D. 292,190 | 10/1987 | Weder et al. . |
| D. 292,191 | 10/1987 | Weder et al. . |
| D. 292,561 | 11/1987 | Weder et al. . |
| D. 292,562 | 11/1987 | Weder et al. . |
| D. 292,563 | 11/1987 | Weder et al. . |
| D. 293,222 | 12/1987 | Weder et al. . |
| D. 293,223 | 12/1987 | Weder et al. . |
| D. 293,224 | 12/1987 | Weder et al. . |
| D. 293,304 | 12/1987 | Weder et al. . |
| D. 293,305 | 12/1987 | Weder et al. . |
| D. 293,306 | 12/1987 | Weder et al. . |
| D. 293,307 | 12/1987 | Weder et al. . |
| D. 293,308 | 12/1987 | Weder et al. . |
| D. 293,774 | 1/1988 | Weder et al. . |
| D. 293,775 | 1/1988 | Weder et al. . |
| D. 296,391 | 6/1988 | Abbott . |
| D. 296,535 | 7/1988 | Weder et al. . |
| D. 297,422 | 8/1988 | Weder et al. . |
| D. 298,017 | 10/1988 | Weder et al. . |
| D. 299,290 | 1/1989 | Abbott . |
| D. 301,183 | 5/1989 | Duclos . |
| D. 301,284 | 5/1989 | Duclos et al. . |
| D. 301,391 | 6/1989 | Duclos et al. . |
| D. 301,565 | 6/1989 | Weder . |
| D. 302,139 | 7/1989 | Weder . |
| D. 302,253 | 7/1989 | Weder . |
| D. 302,254 | 7/1989 | Weder . |
| D. 302,404 | 7/1989 | Weder . |

(List continued on next page.)

*Primary Examiner*—Robert E. Pezzuto
*Attorney, Agent, or Firm*—Seidel, Gonda, Lavorgna & Monaco, PC

[57] ABSTRACT

A flower pot cover of single circular sheet construction comprising a circular planar bottom, an outwardly bowed generally cylindrical side portion upstanding from said bottom about the periphery thereof, said side portion being loosely folded over and against itself to form a circumferentially continuous series of randomly shaped rolled, non-planar vertically elongated ruffles presenting a curved and bowed outwardly facing surface along said cylindrical side portion and extending generally parallel with an axis of said cylinder and forming rolls bowing outwardly proximate the vertical midpoint thereof to provide greater pot cover diameter proximate the vertical midpoint of said side portion than at upper and lower circular extremities of said side portion, an annular lip having a circular outer periphery and extending angularly outwardly and upwardly from said cylindrical side portion about the upper extremity thereof, said annular lip being loosely folded and curled against itself to form a circumferentially continuous series of randomly shaped rolled, non-planar generally vertically and outwardly extending longitudinally elongated transversely curved ruffles presenting curved and bowed upwardly and downwardly facing annular lip surfaces.

1 Claim, 8 Drawing Sheets

U.S. PATENT DOCUMENTS

| | | |
|---|---|---|
| D. 302,405 | 7/1989 | Weder . |
| D. 302,406 | 7/1989 | Weder . |
| D. 302,407 | 7/1989 | Weder . |
| D. 303,775 | 10/1989 | Weder . |
| D. 306,698 | 3/1990 | Garcia . |
| D. 313,376 | 1/1991 | Weder . |
| D. 313,573 | 1/1991 | Weder et al. . |
| D. 313,574 | 1/1991 | Weder et al. . |
| D. 313,575 | 1/1991 | Weder et al. . |
| D. 313,576 | 1/1991 | Weder . |
| D. 314,732 | 2/1991 | Weder . |
| D. 315,534 | 3/1991 | Weder et al. . |
| D. 315,878 | 4/1991 | Weder et al. . |
| D. 315,879 | 4/1991 | Weder et al. . |
| D. 315,880 | 4/1991 | Weder et al. . |
| D. 315,881 | 4/1991 | Weder . |
| D. 315,882 | 4/1991 | Weder . |
| D. 315,883 | 4/1991 | Weder . |
| D. 316,060 | 4/1991 | Weder et al. . |
| D. 316,061 | 4/1991 | Weder . |
| D. 316,062 | 4/1991 | Weder et al. . |
| D. 316,837 | 5/1991 | Weder et al. . |
| D. 316,838 | 5/1991 | Weder et al. . |
| D. 316,985 | 5/1991 | Weder . |
| D. 317,424 | 6/1991 | Weder . |
| D. 317,582 | 6/1991 | Weder . |
| D. 317,583 | 6/1991 | Weder et al. . |
| D. 318,029 | 7/1991 | Weder . |
| D. 318,030 | 7/1991 | Weder et al. . |
| D. 318,635 | 7/1991 | Weder et al. . |
| D. 319,034 | 8/1991 | Weder et al. . |
| D. 319,417 | 8/1991 | Weder et al. . |
| D. 319,991 | 9/1991 | Weder . |
| D. 321,332 | 11/1991 | Weder et al. . |
| D. 322,233 | 12/1991 | Weder . |
| D. 323,795 | 2/1992 | Weder . |
| D. 324,352 | 3/1992 | Weder . |
| D. 324,833 | 3/1992 | Weder . |
| D. 325,889 | 5/1992 | Weder . |
| D. 326,069 | 5/1992 | Weder et al. . |
| D. 326,244 | 5/1992 | Weder . |
| D. 326,245 | 5/1992 | Weder . |
| D. 326,246 | 5/1992 | Weder . |
| D. 326,628 | 6/1992 | Weder . |
| D. 326,830 | 6/1992 | Vaughn . |
| D. 327,234 | 6/1992 | Vaughn . |
| D. 327,235 | 6/1992 | Weder . |
| D. 327,236 | 6/1992 | Weder . |
| D. 327,664 | 7/1992 | Weder . |
| D. 328,043 | 7/1992 | Weder . |
| D. 329,405 | 9/1992 | Weder . |
| D. 329,407 | 9/1992 | Weder et al. . |
| D. 329,408 | 9/1992 | Weder et al. . |
| D. 332,421 | 1/1993 | Weder et al. . |
| D. 332,422 | 1/1993 | Weder et al. . |
| D. 332,423 | 1/1993 | Weder et al. . |
| D. 332,424 | 1/1993 | Weder . |
| D. 332,425 | 1/1993 | Weder . |
| D. 332,426 | 1/1993 | Weder . |
| D. 332,427 | 1/1993 | Weder et al. . |
| D. 332,428 | 1/1993 | Weder et al. . |
| D. 332,429 | 1/1993 | Weder et al. . |
| D. 332,430 | 1/1993 | Weder . |
| D. 332,431 | 1/1993 | Weder . |
| D. 332,432 | 1/1993 | Weder . |
| D. 332,746 | 1/1993 | Garcia . |
| D. 337,074 | 7/1993 | Weder . |
| D. 337,282 | 7/1993 | Weder . |
| D. 337,284 | 7/1993 | Weder . |
| D. 337,285 | 7/1993 | Weder . |
| D. 337,286 | 7/1993 | Weder . |
| D. 337,287 | 7/1993 | Weder . |
| D. 337,549 | 7/1993 | Weder . |
| D. 338,429 | 8/1993 | Weder . |
| D. 338,625 | 8/1993 | Weder . |
| D. 339,085 | 9/1993 | Weder . |
| D. 339,551 | 9/1993 | Weder . |
| D. 339,765 | 9/1993 | Weder . |
| D. 339,766 | 9/1993 | Weder . |
| D. 339,767 | 9/1993 | Weder . |
| D. 340,675 | 10/1993 | Weder . |
| D. 340,883 | 11/1993 | Weder . |
| D. 340,884 | 11/1993 | Weder . |
| D. 340,885 | 11/1993 | Weder . |
| D. 341,549 | 11/1993 | Weder et al. . |
| D. 341,550 | 11/1993 | Weder . |
| D. 341,794 | 11/1993 | Weder et al. . |
| D. 341,795 | 11/1993 | Weder et al. . |
| D. 341,796 | 11/1993 | Weder . |
| D. 342,042 | 12/1993 | Weder . |
| D. 343,594 | 1/1994 | Weder . |
| D. 346,765 | 5/1994 | Weder . |
| D. 348,634 | 7/1994 | Weder et al. . |
| D. 348,635 | 7/1994 | Weder . |
| D. 349,076 | 7/1994 | Weder et al. . |
| D. 352,918 | 11/1994 | Weder et al. . |
| D. 355,392 | 2/1995 | Weder et al. . |
| D. 355,395 | 2/1995 | Weder et al. . |
| D. 355,591 | 2/1995 | Weder et al. . |
| D. 355,592 | 2/1995 | Weder et al. . |
| D. 355,594 | 2/1995 | Weder et al. . |
| D. 355,596 | 2/1995 | Weder et al. . |
| D. 356,027 | 3/1995 | Weder et al. . |
| D. 356,028 | 3/1995 | Weder et al. . |
| D. 356,029 | 3/1995 | Weder et al. . |
| D. 356,030 | 3/1995 | Weder et al. . |
| D. 356,032 | 3/1995 | Weder et al. . |
| D. 356,755 | 3/1995 | Weder et al. . |
| 1,868,853 | 7/1932 | Sievers . |
| 2,097,929 | 11/1937 | Lovett, Jr. . |
| 2,302,259 | 11/1942 | Rothfuss . |
| 3,044,438 | 7/1962 | Osswald et al. . |
| 3,962,503 | 6/1976 | Crawford ................................ 47/72 X |
| 4,216,620 | 8/1980 | Weder et al. . |
| 4,297,811 | 11/1981 | Weder . |
| 4,300,312 | 11/1981 | Weder et al. . |
| 4,335,271 | 6/1982 | Haslbeck . |
| 4,348,775 | 9/1982 | Haslbeck . |
| 4,398,849 | 8/1983 | Moran et al. . |
| 4,491,217 | 1/1985 | Weder et al. . |
| 4,606,335 | 8/1986 | Wedeen . |
| 4,662,008 | 5/1987 | Weiser . |
| 4,704,808 | 11/1987 | Bianchini et al. . |
| 4,733,521 | 3/1988 | Weder et al. . |
| 4,768,575 | 9/1988 | Bruner et al. . |
| 4,773,182 | 9/1988 | Weder et al. . |
| 4,835,834 | 6/1989 | Weder . |
| 4,852,275 | 8/1989 | Bianchini et al. . |
| 4,897,031 | 1/1990 | Weder et al. . |
| 4,901,423 | 2/1990 | Weder . |
| 4,950,216 | 8/1990 | Weder . |
| 4,980,209 | 12/1990 | Hill . |
| 4,989,396 | 2/1991 | Weder et al. . |
| 5,007,229 | 4/1991 | Weder et al. . |
| 5,029,412 | 7/1991 | Weder et al. ............................... 47/72 |
| 5,033,232 | 7/1991 | Vaughn . |
| 5,038,933 | 8/1991 | Weder . |
| 5,070,645 | 12/1991 | Vaughn . |
| 5,072,460 | 12/1991 | Weder . |
| 5,073,161 | 12/1991 | Weder et al. . |
| 5,076,874 | 12/1991 | Weder . |
| 5,077,937 | 1/1992 | Weder et al. . |

| | | | |
|---|---|---|---|
| 5,085,003 | 2/1992 | Garcia . | |
| 5,092,465 | 3/1992 | Weder et al. . | |
| 5,105,599 | 4/1992 | Weder . | |
| 5,111,613 | 5/1992 | Weder et al. . | |
| 5,111,637 | 5/1992 | Weder et al. . | |
| 5,111,638 | 5/1992 | Weder . | |
| 5,111,741 | 5/1992 | Weder et al. . | |
| 5,120,382 | 6/1992 | Weder . | |
| 5,120,583 | 6/1992 | Garcia . | |
| 5,127,817 | 7/1992 | Weder et al. . | |
| 5,129,182 | 7/1992 | Weder . | |
| 5,148,918 | 9/1992 | Weder et al. . | |
| 5,152,100 | 10/1992 | Weder et al. . | |
| 5,152,101 | 10/1992 | Weder et al. . | |
| 5,156,702 | 10/1992 | Weder . | |
| 5,161,348 | 11/1992 | Weder . | |
| 5,176,609 | 1/1993 | Weder et al. . | |
| 5,181,339 | 1/1993 | Weder et al. . | |
| 5,181,364 | 1/1993 | Weder . | |
| 5,184,390 | 2/1993 | Weder . | |
| 5,195,637 | 3/1993 | Weder . | |
| 5,199,242 | 4/1993 | Weder et al. . | |
| 5,205,108 | 4/1993 | Weder et al. . | |
| 5,208,027 | 5/1993 | Weder et al. . | |
| 5,221,248 | 6/1993 | Weder et al. . | |
| 5,228,236 | 7/1993 | Weder et al. . | |
| 5,228,934 | 7/1993 | Weder et al. . | |
| 5,231,794 | 8/1993 | Weder et al. . | |
| 5,238,382 | 8/1993 | Weder et al. . | |
| 5,239,804 | 8/1993 | Weder et al. . | |
| 5,240,109 | 8/1993 | Weder et al. . | |
| 5,242,052 | 9/1993 | Weder . | |
| 5,245,814 | 9/1993 | Weder . | |
| 5,254,072 | 10/1993 | Weder et al. . | |
| 5,255,784 | 10/1993 | Weder et al. . | |
| 5,259,106 | 11/1993 | Weder et al. . | |
| 5,262,222 | 11/1993 | Kingman . | |
| 5,274,900 | 1/1994 | Weder . | |
| 5,286,246 | 2/1994 | Weder et al. . | |
| 5,286,247 | 2/1994 | Weder et al. . | |
| 5,291,721 | 3/1994 | Weder et al. . | |
| 5,297,359 | 3/1994 | Garcia . | |
| 5,303,506 | 4/1994 | Weder et al. . | |
| 5,307,605 | 5/1994 | Straeter . | |
| 5,307,606 | 5/1994 | Weder . | |
| 5,311,991 | 5/1994 | Weder et al. . | |
| 5,311,992 | 5/1994 | Weder et al. . | |
| 5,314,398 | 5/1994 | Weder et al. | 47/72 X |
| 5,327,635 | 7/1994 | Weder et al. . | |
| 5,332,610 | 7/1994 | Weder et al. . | |
| 5,335,475 | 8/1994 | Weder et al. . | |
| 5,335,476 | 8/1994 | Weder . | |
| 5,335,477 | 8/1994 | Weder . | |
| 5,339,565 | 8/1994 | Weder et al. . | |
| 5,339,601 | 8/1994 | Weder et al. . | |
| 5,344,016 | 9/1994 | Weder et al. . | |
| 5,345,745 | 9/1994 | Weder . | |
| 5,347,789 | 9/1994 | Weder . | |
| 5,349,739 | 9/1994 | Weder . | |
| 5,350,349 | 9/1994 | Weder et al. . | |
| 5,350,473 | 9/1994 | Weder et al. . | |
| 5,361,482 | 11/1994 | Weder et al. . | |
| 5,363,592 | 11/1994 | Weder et al. . | |
| 5,363,630 | 11/1994 | Weder et al. . | |
| 5,369,934 | 12/1994 | Weder . | |
| 5,373,942 | 12/1994 | Weder . | |
| 5,373,943 | 12/1994 | Weder et al. . | |
| 5,381,642 | 1/1995 | Weder et al. . | |
| 5,387,446 | 2/1995 | Weder . | |
| 5,388,386 | 2/1995 | Weder . | |
| 5,391,208 | 2/1995 | Weder et al. . | |
| 5,392,161 | 2/1995 | Weder et al. . | |
| 5,396,992 | 3/1995 | Weber . | |
| 5,402,599 | 4/1995 | Weder et al. . | |
| 5,402,601 | 4/1995 | Garcia . | |
| 5,414,959 | 5/1995 | Weder et al. | 47/72 |
| 5,501,039 | 3/1996 | Weder et al. | 47/72 |
| 5,509,188 | 4/1996 | Weder et al. | 47/72 X |
| 5,624,723 | 4/1997 | Weder et al. | 47/72 X |

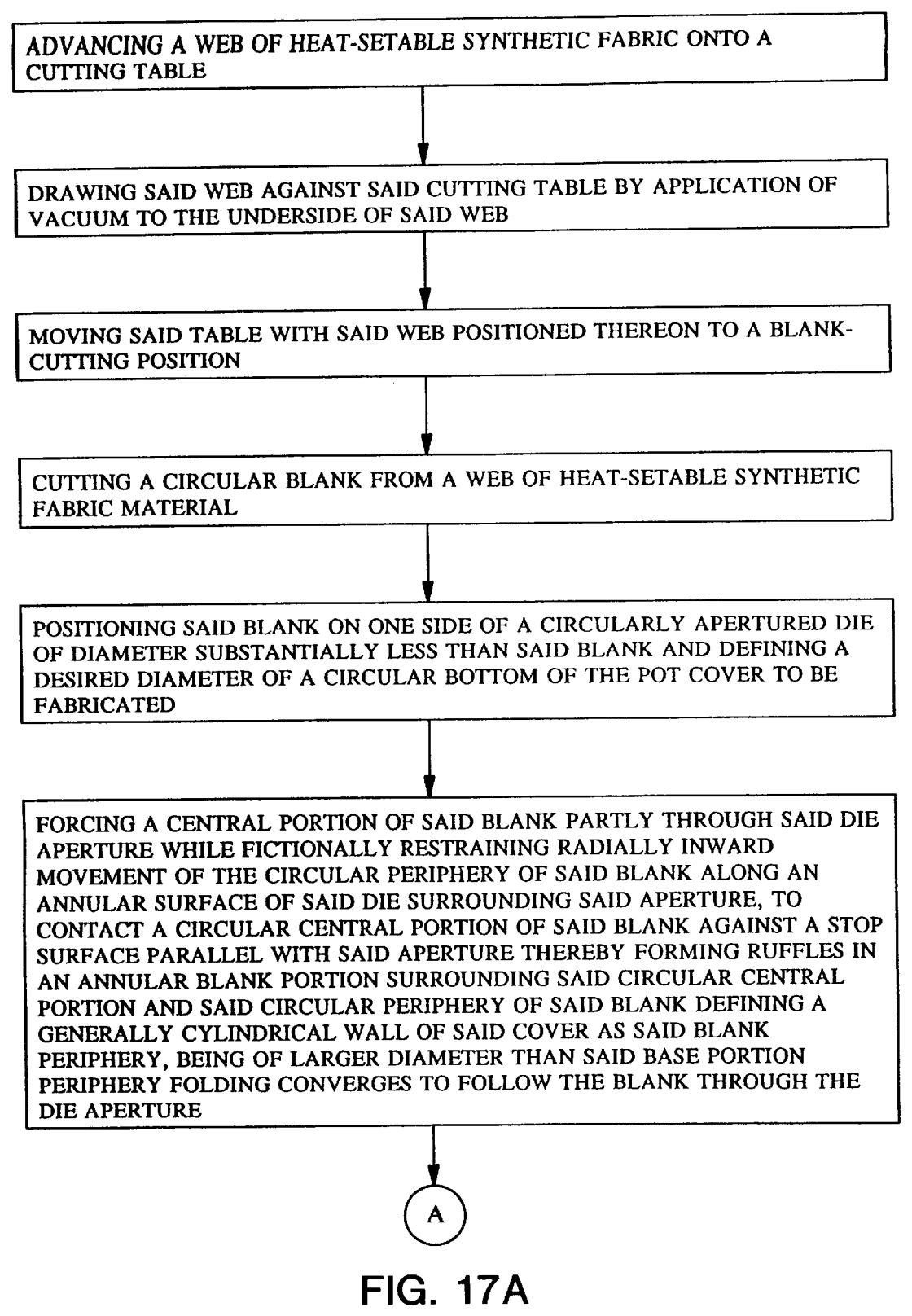

ADVANCING A WEB OF HEAT-SETABLE SYNTHETIC FABRIC ONTO A CUTTING TABLE

↓

DRAWING SAID WEB AGAINST SAID CUTTING TABLE BY APPLICATION OF VACUUM TO THE UNDERSIDE OF SAID WEB

↓

MOVING SAID TABLE WITH SAID WEB POSITIONED THEREON TO A BLANK-CUTTING POSITION

↓

CUTTING A CIRCULAR BLANK FROM A WEB OF HEAT-SETABLE SYNTHETIC FABRIC MATERIAL

↓

POSITIONING SAID BLANK ON ONE SIDE OF A CIRCULARLY APERTURED DIE OF DIAMETER SUBSTANTIALLY LESS THAN SAID BLANK AND DEFINING A DESIRED DIAMETER OF A CIRCULAR BOTTOM OF THE POT COVER TO BE FABRICATED

↓

FORCING A CENTRAL PORTION OF SAID BLANK PARTLY THROUGH SAID DIE APERTURE WHILE FICTIONALLY RESTRAINING RADIALLY INWARD MOVEMENT OF THE CIRCULAR PERIPHERY OF SAID BLANK ALONG AN ANNULAR SURFACE OF SAID DIE SURROUNDING SAID APERTURE, TO CONTACT A CIRCULAR CENTRAL PORTION OF SAID BLANK AGAINST A STOP SURFACE PARALLEL WITH SAID APERTURE THEREBY FORMING RUFFLES IN AN ANNULAR BLANK PORTION SURROUNDING SAID CIRCULAR CENTRAL PORTION AND SAID CIRCULAR PERIPHERY OF SAID BLANK DEFINING A GENERALLY CYLINDRICAL WALL OF SAID COVER AS SAID BLANK PERIPHERY, BEING OF LARGER DIAMETER THAN SAID BASE PORTION PERIPHERY FOLDING CONVERGES TO FOLLOW THE BLANK THROUGH THE DIE APERTURE

↓

(A)

FIG. 17A

FLOWER POT COVER, FLOWER POT AND METHOD FOR MANUFACTURE OF THE SAME

BACKGROUND OF THE INVENTION

1. Field of the Invention

This invention relates to flexible flower pot covers that generally conform about the periphery of the flower pot, to flower pots for retention of verticular cuttings therein and to methods for the manufacture of such flower pot coverings and flower pots.

BACKGROUND OF THE INVENTION

2. Description of the Prior Art

The flower pot cover art is a crowded and well developed art. Typical of the patents and prior art references known to applicant and believed by applicant to have the most relevant patentability of this invention are United States design patent D318,038 and U.S. Pat. No. 5,111,613. Copies of these two patent references together with copies of many, many more patent references which may arguably be relevant to the patentability of this invention will be submitted as a part of an Information Disclosure Statement shortly after this application is filed. In that regard applicant may request amendment of the description of the prior art portion of this specification to include description of any prior art coming to the attention of applicant which applicant believes to be particularly pertinent to the patentability of this invention. Applicant may exercise this right in order to present a coherent and complete document as applicant's patent to any prospective licensee, to third parties who are infringers and to United States District Court judges and juries who will be charged with evaluating any such infringement claims.

SUMMARY OF THE INVENTION

In one of its aspects this invention provides a flower pot and a flower pot cover which include a generally circular substantially planar bottom. The flower pot and the flower pot cover further preferably include a side upstanding from the bottom about the periphery thereof with parts of the side being loosely folded against themselves, preferably to form a preferably continuous series of preferably randomly shaped ruffles, with the ruffles preferably bowing outwardly preferably proximate their vertical midpoint to define a side preferably having greater diameter proximate the vertical midpoint of the side than at the upper and lower extremities of the side.

An annular lip preferably extends angularly preferably outwardly and preferably upwardly from the cylindrical side preferably about the periphery thereof and is preferably loosely folded against itself to form a preferably circumferentially continuous series of preferably randomly shaped generally vertically and outwardly extending ruffles. The ruffles are preferably curved.

In the flower pot and flower pot cover in the preferred embodiment of the invention, preferably individual ruffles preferably extend generally vertically along the side, preferably upwardly and preferably angularly outwardly along the lip and are preferably continuous in a zone of transition defining juncture of the side and the lip.

In other words the individual ruffles preferably are curved preferably in a manner that they curve away from the side preferably in the neighborhood of the midpoint of the vertical side of the flower pot cover and with the individual ruffles preferably curving back inwardly towards the side preferably at the vertical extremities of the side near the top and the bottom of the side of the flower pot or flower pot cover.

In another aspect of the flower pot and flower pot cover of the invention, the ruffles are preferably continuously curved. The ruffles are even more preferably continuously curved to lie in substantially vertical planes. Preferably some ruffles join one another proximate juncture of the pot cover side and bottom portions so that there is a substantial bend or curvature in the joined ruffles essentially transversely to the preferably substantially vertically planes in which the ruffles are preferably continuously curved.

The ruffles preferably overlap; this is especially so at transition between the side and lip portions of the flower pot or flower pot cover.

In another aspect of the invention the lip edge extremities preferably curve continuously transversely or at least substantially to the plane of the fabric defining the lip.

Most preferably the ruffles are different and have variable lengths. Especially preferably the ruffles are disposed at different angles respecting the pot cover.

The ruffles preferably have different variable lengths and are preferably disposed at different angles respecting the pot cover.

In yet another aspect of the invention a flower pot cover preferably includes a single piece of fabric heat-treated to retain its pot-covering shape, where the fabric has a circular generally planar bottom substantially devoid of folds, transitioning into a preferably ruffled upstanding, substantially cylindrical side, in turn transitioning into a preferably angularly upstanding and outwardly extending ruffled annular lip defining a generally circular opening for the cover.

The flower pot or flower pot cover in this aspect of the invention may further include an open cup for providing additional structural integrity and holding soil, water and/or plant cuttings with the cup being within and complementally contacting the piece of fabric along the bottom portion thereof with the open cup facing the lip of the cover. Desirably, the cup may further contact the piece of fabric along the side portion thereof.

In this embodiment of the flower pot cover there may be further included an elastic band or filament, preferably tied into a bow and angularly positioned about the outwardly facing surface of the side of the fabric piece proximate the transition to the lip.

In this aspect of the invention the ruffles preferably softly overlap and especially preferably softly overlap at the transition between the cover side and lip portions. The lip edge extremity is continuously curved transversely to the plane of the fabric defining the lip.

Preferably the ruffles are softly formed and have different and variable lengths, and are preferably disposed at different angles respecting the pot cover. The ruffles are desirably preferably positioned randomly over the pot cover side and lip and are preferably continuously curved with the continuous curves preferably being in or along substantially vertical planes.

In this embodiment of the invention there is further optionally provided an open cup for providing additional structural integrity and holding soil, water and/or plant cuttings with the cup being within and complementally contacting a piece of fabric along the bottom portion thereof, with the open portion of the cup facing the lip of the cover and contacting the fabric along the side portion thereof. The lip edge extremity preferably continuously curves transversely to the plane of the fabric defining the lip.

Desirably some of the ruffles have variable lengths, are positioned at different angles respecting the pot cover and randomly over the cover side and lip and overlap at the zone of transition between cover side and lip portions.

The lip edge extremity is preferably continuously curved preferably transversely to the plane of the fabric defining the lip.

In another aspect of this invention there is provided a method for fabricating a flower pot cover which preferably includes the steps of preferably advancing a web of heat-setable synthetic fabric onto a cutting table, preferably drawing the web against the cutting table by application of vacuum to the underside of the web, preferably moving the table preferably with the web positioned thereon to a blank-cutting position and preferably cutting a circular blank from a web of heat-setable synthetic fabric material. This is preferably followed by preferably positioning the blank preferably on one side of circular aperture of diameter substantially less than the blank and preferably defining a desired diameter of a circular bottom of the pot cover to be fabricated.

This may preferably be followed by forcing a central portion of the blank partly through the die aperture while preferably frictionally restraining radially inward movement of the circular periphery of the blank along an annular surface in the die surrounding the aperture. The central portion of the blank is advanced to contact a stop surface which preferably is parallel with the aperture through which the blank has been drawn. This forms ruffles in an annular blank portion surrounding the central circular blank portion and in the circular periphery of the blank with the annular blank portion defining a generally cylindrical wall of the cover as the blank periphery, being of larger diameter than the circular base portion periphery, foldingly converges to follow the blank base portion through the die aperture.

The next step desirably includes applying heat to the blank preferably at least in the neighborhood where the blank transitions from the circular bottom portion to the side portion and preferably where the cylindrical side portion transitions to the annular lip. The heat is desirably applied for a sufficient time to set the web of material into the desired shape of the pot or pot cover.

Next there is desirably applied a radially inward circumferential bias to the now-ruffled blank at a position proximate what will be the vertical extremity of the pot wall, proximate the transition of the pot wall to the lip during application of heat thereto.

Most desirably the circular central portion of the blank is retained against the central stop surface until the heat produces a permanent set in the fabric blank and the blank conforms to the desired pot or pot cover shape.

Other aspects of the method portion of the invention may embrace applying heat to the wall portion of the pot cover or pot to set the pleats, ruffles or folds in place and urging only the upper portion of the wall radially inwardly as the heat is applied, as well as similar variations.

When cutting the blank is performed it is desirably performed using a circular cutting knife although a circular male cutting die may also be used. The stop surface against which the fabric blank is pushed through the aperture is desirably a planar stop surface.

BRIEF DESCRIPTION OF THE DRAWINGS

FIG. 11 has been illustrated with a flower pot shown within the flower pot cover where the flower pot is depicted in dotted lines.

Figure 1:
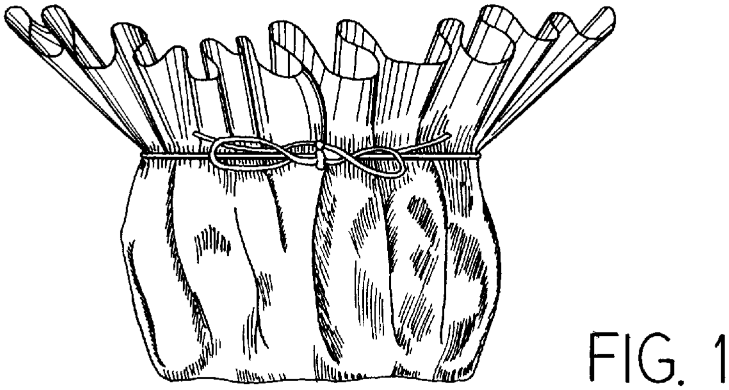
FIG. 1 is a front view of a flower pot cover manifesting aspects of the invention where the flower pot or flower pot cover has been fabricated using a fabric with a sheen finish on the outer surface.

DESCRIPTION OF THE PREFERRED EMBODIMENTS MODE KNOWN FOR PRACTICING THE INVENTION erring to the drawings in general and particularly to FIG. 1, there is illustrated a flower pot cover designated generally 10 constructed in accordance with the present invention. In the preferred embodiment, the article shown in the drawings is a flower pot cover which is adapted for providing a decorative cover for a flower pot. In another embodiment, however, the article shown in the drawings may be used as a flower pot which is adapted to support floral groupings or verticular cuttings in a manner well known in the art.

Referring specifically to FIG. 1, flower pot cover 10 includes a generally circular substantially planar bottom designated generally 12, a generally cylindrical side portion designated generally 14 and an annular lip designated generally 18.

Side portion 14 preferably includes ruffles 16 formed therein where individual ruffles have been designated 16I in FIG. 1.

Annular lip 18, similarly to generally cylindrical side 14, also includes ruffles which have been designated generally 20 in FIG. 1 where individual ruffles in annular lip 18 have been designated 20 I.

Generally cylindrical side 14 transitions into annular lip 18 in a zone of transition which has been designated generally 22 and defines juncture of side 14 and lip 18. Zone of transition 22 is denoted by a bracket in FIG. 1.

Ruffles 16I formed in generally cylindrical side 14 of pot cover 10 are formed in a curved fashion as designated generally by ruffles 16I' and thereby provide a side surface 14 which has maximum width or diameter approximately at the vertical midpoint of ruffle 16I on cylindrical side 14. This approximate midpoint of maximum diameter has been denoted 24 in FIG. 1.

Figure 2:
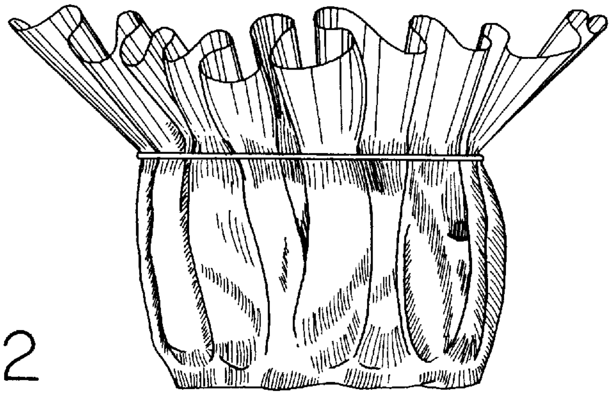
FIG. 2 is a rear view of the flower pot or flower pot cover illustrated in FIG. 1.

Ruffles 16 in side 14 are randomly formed. Nevertheless, adjacent ruffles 16I in side 14 tend to join one another as illustrated at 26 in FIGS. 1 and 2 where such joining takes place proximate the juncture of the bottom inside portions of the flower pot cover.

Since ruffles 16I are randomly formed, ruffle 16 tend to overlap one another. Designator 28 denotes a position of typical ruffle overlap in FIG. 1.

Ruffle overlap is especially prevalent at the zone of transition 22 between side portion 14 and annular lip 18. Overlap of two adjacent ruffles in typical form is designated 30 in FIG. 1.

The flower pot cover manifesting aspects of the invention as illustrated in the drawings includes an open upper end designated generally 34 in FIG. 1 which defines an opening in the flower pot cover which extends a distance down through annular lip 18, within generally cylindrical side 14 and terminates at base 12.

Figure 4:
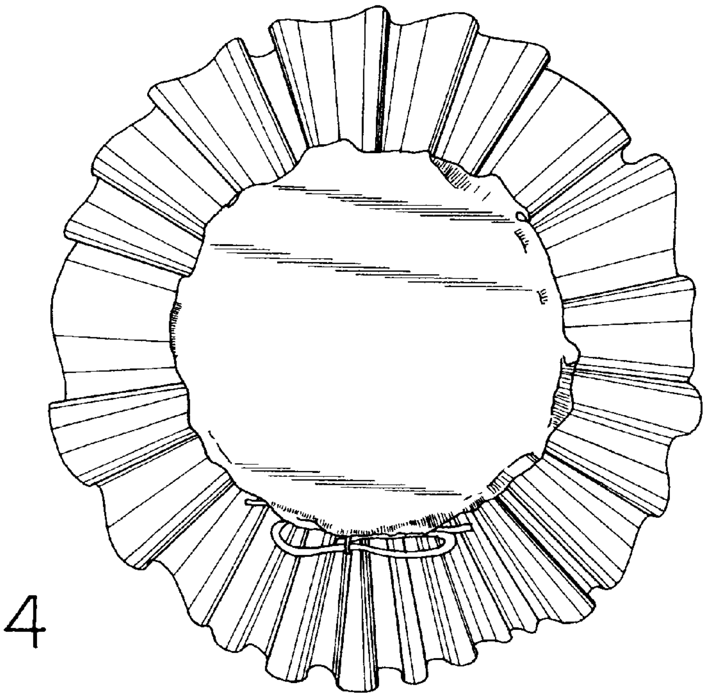
FIG. 4 is a bottom view of the flower pot or flower pot cover manifesting aspects of the invention as illustrated in FIGS. 1,2 and 3.
Figure 5:
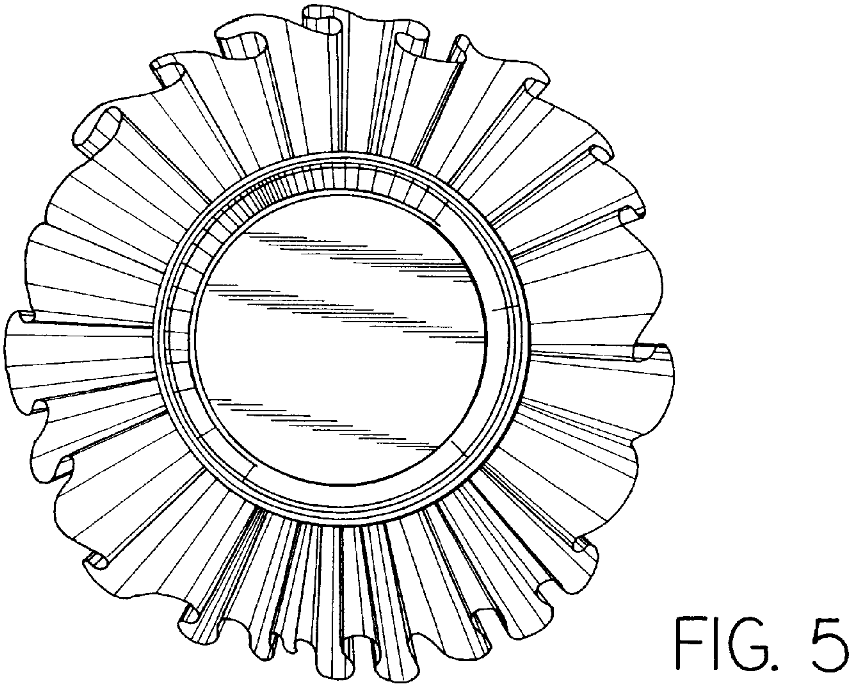
FIG. 5 is a top view of the flower pot cover or flower pot manifesting aspects of the invention as illustrated in FIGS. 1 through 4.
Figure 6:
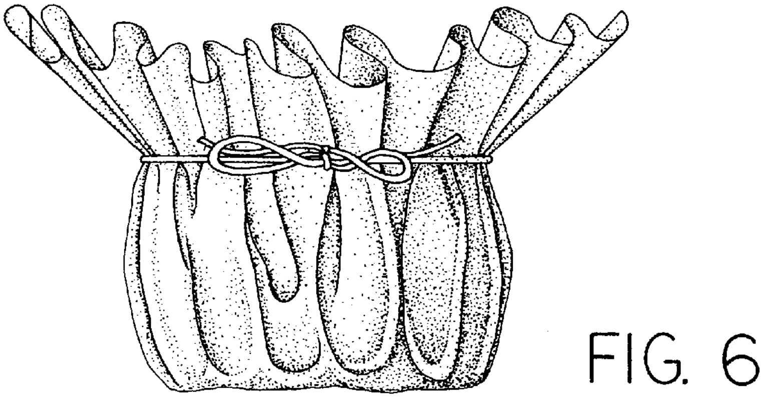
FIG. 6 is a front view of a flower pot cover or flower pot manifesting aspects of the invention where the flower pot or flower pot cover has been fabricated using a fabric with a matte finish on the outer surface.
Figure 7:
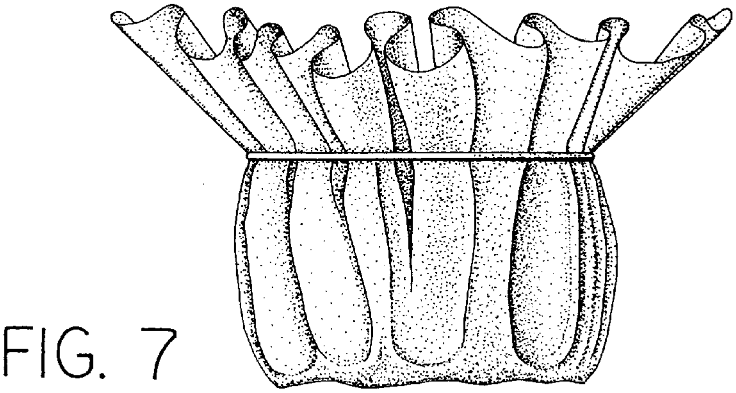
FIG. 7 is a rear view of the flower pot or flower pot cover illustrated in FIG. 6.
Figure 8:
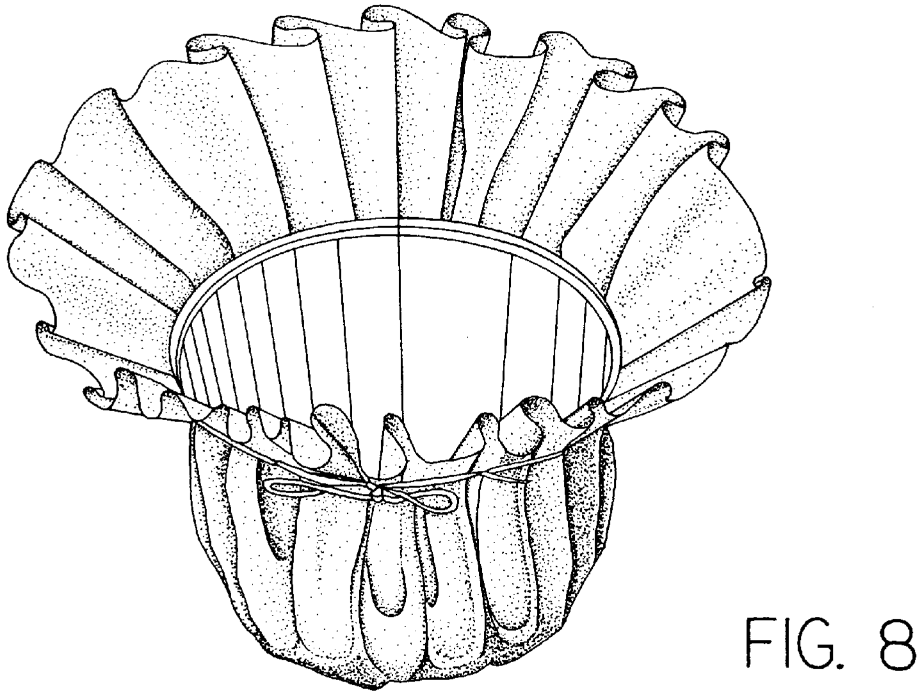
FIG. 8 is a perspective view taken from the upper front, of the flower pot or flower pot cover of FIGS. 6 and 7.
Figure 9:
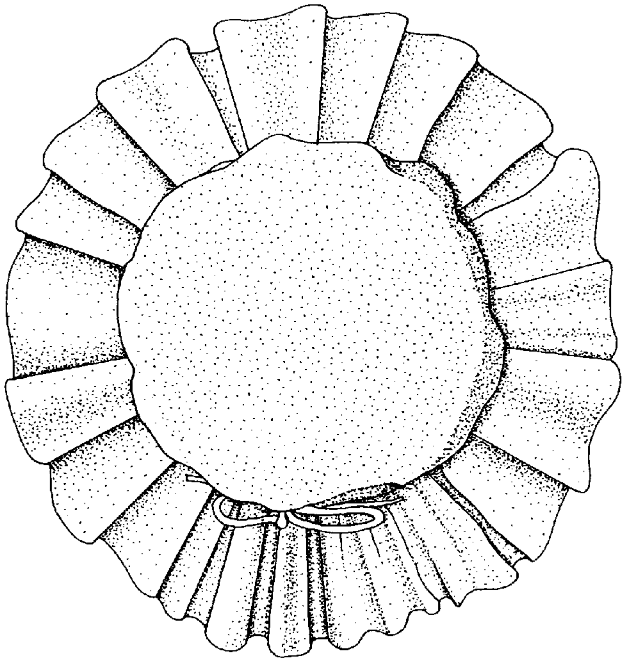
FIG. 9 is a bottom view of the flower pot or flower pot cover assembly manifesting the invention as illustrated in FIGS. 6, 7 and 8.
Figure 10:
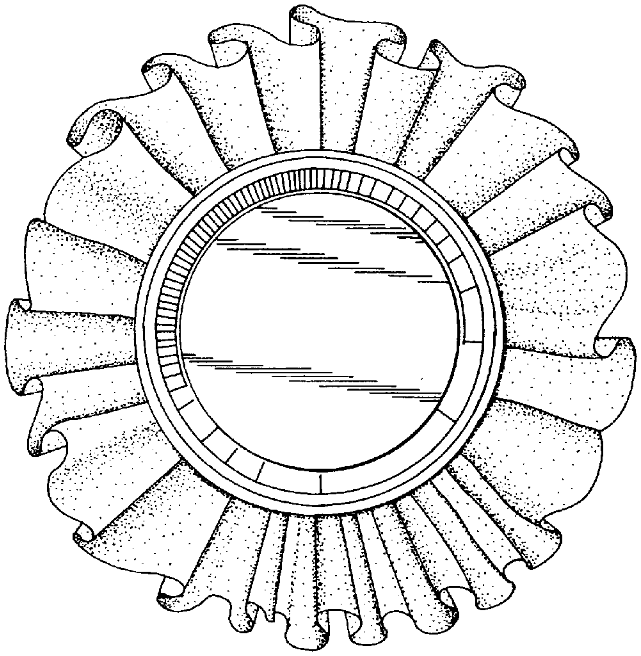
FIG. 10 is a top view of the flower pot cover or flower pot manifesting aspects of the invention illustrated in FIGS. 6 through 9.
Figure 11:
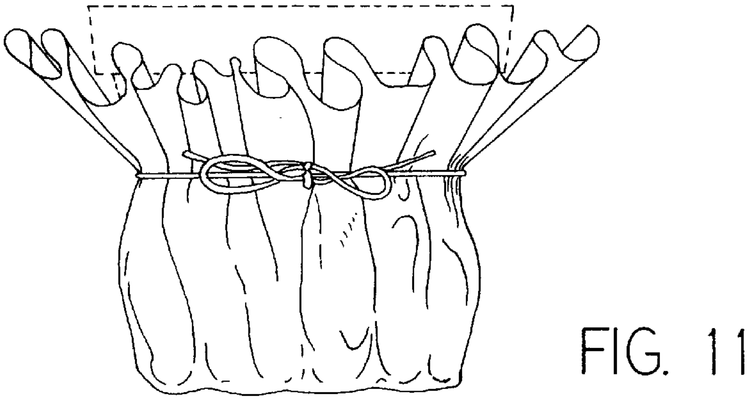
FIG. 11 is a front view of an embodiment of the flower pot cover or flower pot of the invention similar to those illustrated in FIGS. 1 and 6 but without detailing the particular surface sheen or matte characteristics for the fabric component of the flower pot or flower pot cover illustrated in FIG. 11.
Figure 12:
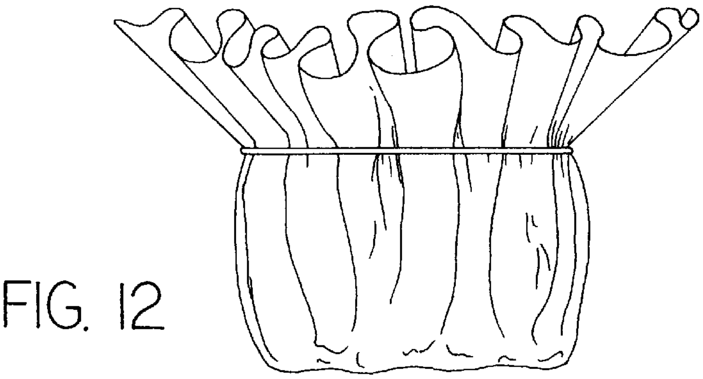
FIG. 12 is a rear view of the flower pot cover illustrated in FIG. 11 but lacking the flower pot depicted in dotted lines in FIG. 11.
Figure 13:
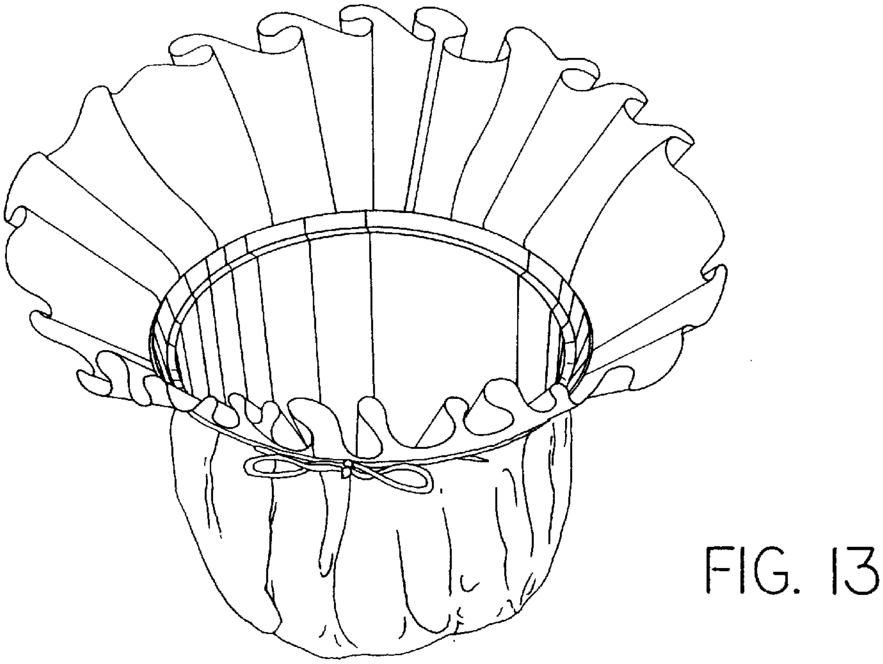
FIG. 13 is a perspective view taken from the upper front of the flower pot cover illustrated in FIGS. 11 and 12 with the flower pot illustrated in FIG. 11 not shown.
Figure 14:
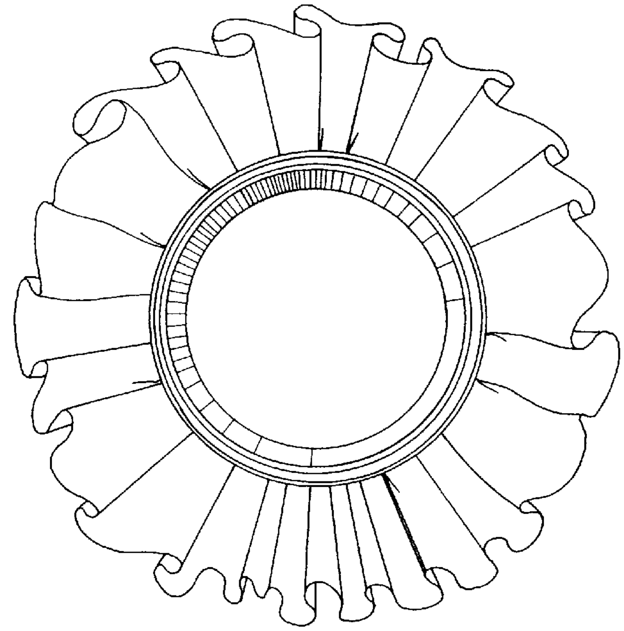
FIG. 14 is a top view of the flower pot cover or flower pot manifesting aspects of the invention illustrated in FIGS. 11 through 13.
Figure 15:
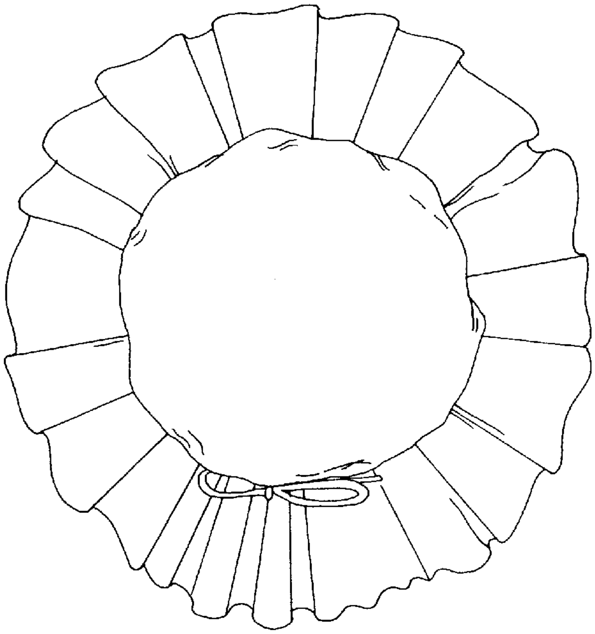
FIG. 15 is a bottom view of the flower pot or flower pot cover assembly manifesting the invention as illustrated in FIGS. 11 through 14.
Figure 16:
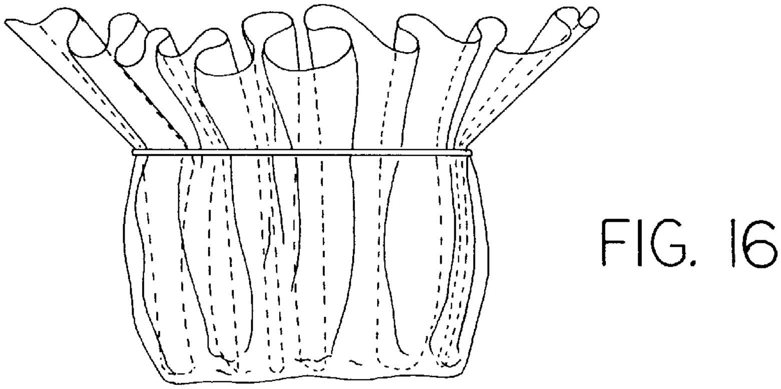
FIG. 16 is a side view of the flower pot cover illustrated in FIGS. 11–15 in which dotted lines have been used to depict the hidden edges of some of the ruffles in the flower pot cover.

As best illustrated in FIG. 4, base 12 is substantially flat and devoid of folds, unlike prior art designs. This enhances the stability of the flower pot cover and any flower pot housed within the flower pot cover.

Preferably, the flower pot cover base 12, cylindrical side 14 and annular lip 18 are formed integrally, from a single piece of fabric.

Cylindrical side 14 upstanding from bottom 12 about the periphery of bottom 12 has parts of cylindrical side 14 loosely folded against themselves to form the circumferentially continuous series of randomly shaped ruffles 16. As is apparent from FIG. 1, ruffles 16 bow outwardly proximate the vertical midpoint, namely proximate the point designated by numeral 24, to define a side of 14 of greater diameter proximate to vertical midpoint 24 of side 14 than at the upper and lower extremities of side 14 which have been designated 36 and 38, respectively.

Annular lip 18 extends angularly outwardly and upwardly from cylindrical side 14 about the periphery of cylindrical side 14 and is loosely folded against itself to form a circumferentially continuous series of randomly shaped generally vertically and outwardly extending ruffles 20 as illustrated in FIG. 1.

The ruffles in the flower pot cover, both ruffles 16 forming a portion of generally cylindrical side 14 and ruffles 20 forming a portion of annular lip 18, are preferably curved as illustrated in FIG. 1.

Most preferably, individual ruffles 16I extend generally vertically along the cylindrical side 14 of the flower pot cover and further extend upwardly and radially outwardly along lip 18 and are continuous in zone of transition 22 defining juncture of side 14 with lip 18 of flower pot cover 10.

Individual ruffles 16I extending generally vertically along side 14 preferably curve in a way that the maximum width or diameter of side 14 occurs proximate to vertical midpoint of side 14 as indicated at 24 in FIG. 1. Ruffles 16 are preferably continuously curved and are preferably in substantially vertical planes along side 14. As illustrated some of the ruffles 16I join one another at the proximate juncture of pot cover side and bottom portions 14 and 12, respectively. Preferably ruffles 16I overlap at least in part as do ruffles 20I and such overlapping also occurs within transition region 22 between cover side 14 and lip 18.

An extremity edge of lip 18 is designated generally 40 in FIG. 1. Lip edge extremity 40 is preferably continuously curved transversely to the plane of the fabric, from which annular lip 18 is preferably fabricated, defining lip 18.

As illustrated in FIG. 1, ruffles 16I and 20I preferably have different and variable lengths and ruffles 16I and 20I are disposed at different angles respecting pot cover 10.

Some of the ruffles are concave with respect to the outer surface of cylindrical side 14 while others of the ruffles are convex with respect to the outer surface of cylindrical side 14.

Bottom 12 is preferably generally circular and substantially planar whereas side 14 is preferably generally cylindrical and upstanding from bottom 12 about the periphery of bottom 12.

Flower pot cover 10 as illustrated in FIG. 1 is, with the exception of a filament 42 tied into the form of a bow and proximate the juncture of cylindrical side 14 and annular lip 18, as illustrated in FIG. 1, preferably formed substantially from a single piece of fabric which has been heat-treated to retain its pot-covering shape. In such case the fabric is heat-treated from a single piece of material having a circular generally planar bottom substantially devoid of folds, which transitions into the ruffle upstanding substantially cylindrical side 14, which in turn transitions into an angularly upstanding and outwardly extending ruffled annular lip 18 defining a generally circular opening for the cover.

Figure 3:
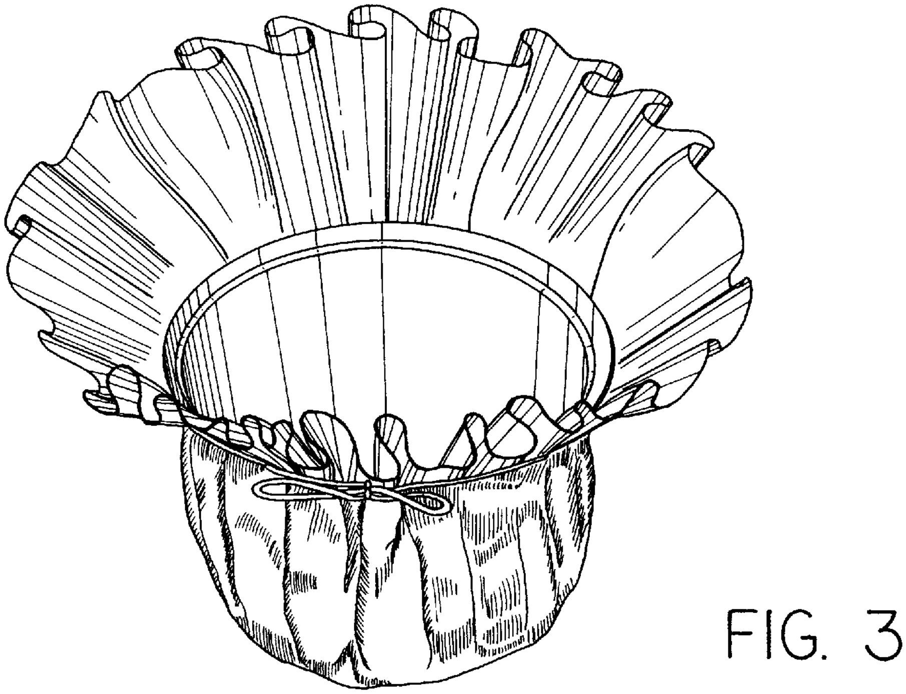
FIG. 3 is a perspective view looking at the upper front of the flower pot or flower pot cover of FIGS. 1 and 2.

As illustrated in FIG. 3, the flower pot cover may further include an open cup 44 which provides additional structural integrity to the flower pot cover and may be used to hold soil, water and/or plant cuttings. Cup 44 is preferably within and preferably complementally contacts the fabric from which generally cylindrical side 14 and bottom portion 12 of the flower pot cover are fabricated, with the contact between the bottom of open cup 44 and the bottom 12 of the flower pot cover 10 being essentially complemental. Of course, the open end of cup 44 faces lip 18 of flower pot cover 10. Preferably there is substantial sliding contact between the lateral surfaces of open cup 44 and cylindrical side surface 14 of flower pot cover 10.

As illustrated in FIGS. 1, 2, 3 and 4, the flower pot cover may additionally include an elastic filament 42 optionally having a bow tied therein, which is angularly positioned, usually by hand, about the outwardly facing surface 14 of the flower pot cover fabric at a position proximate the zone of transition 22 between flower pot cover cylindrical side 14 and annular lip 18.

The flower pot cover according to the invention is preferably fabricated using a single piece of heat-setable fabric to retain its pot-covering shape with the flower pot cover cylindrical side 14, bottom 12 and annular lip 18 all being fabricated from such single piece of fabric. Desirably, the flower pot cover may be fabricated from a polypropylene/polyethylene blend extruded sheet which may be embossed or unembossed and may be printed or unprinted. Alternatively, the flower pot cover portions consisting of bottom 12, cylindrical side 14 and annular lip 18 may be fabricated from a laminated or unlaminated Pet film which may be preferably 48 gauge. Suitable polypropylene/polyethylene blend extruded sheet material for fabricating the flower pot cover is available from Berwick Industries, Inc. in Berwick, Pa.

Figure 17B:
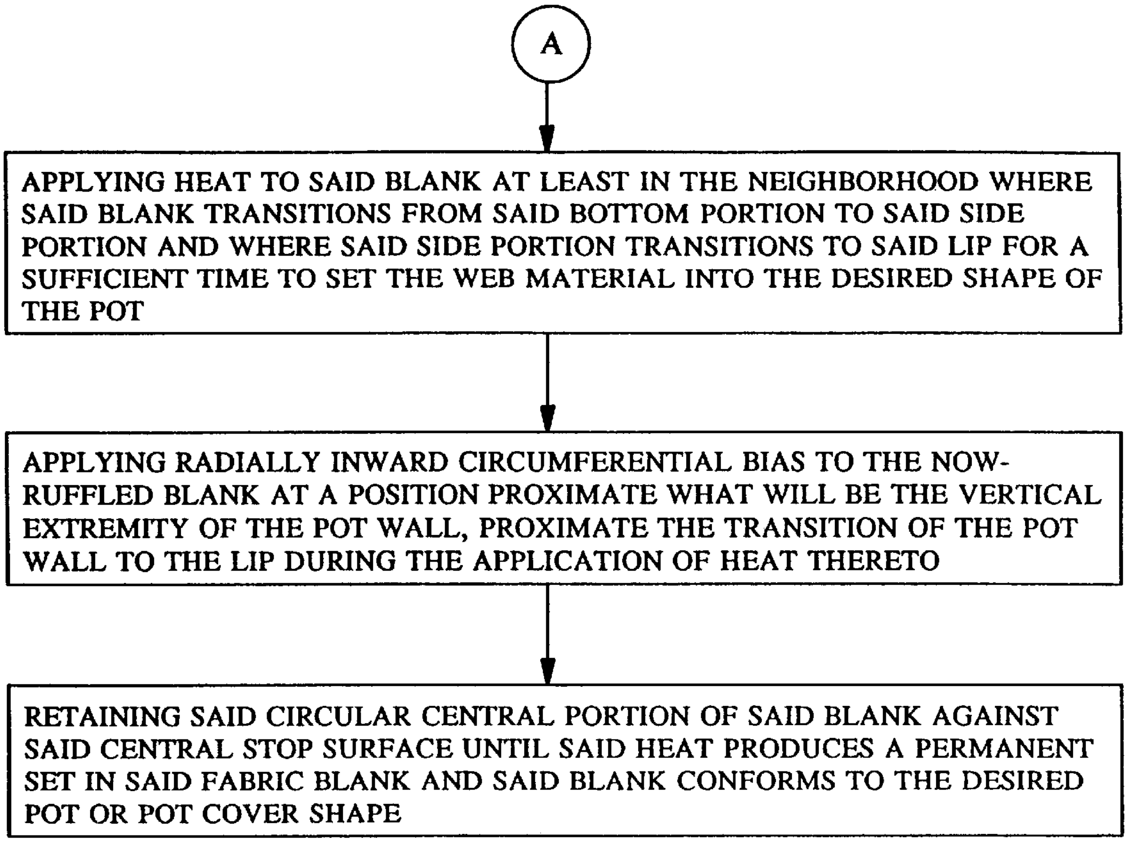
FIGS. 17*a* & *b* are a schematic block diagram of a process for fabricating the flower pot cover.

As depicted schematically in FIG. 17 in the course of manufacturing a flower pot cover in accordance with the invention, initially a web of heat-setable suitable synthetic fabric is preferably advanced onto a cutting table. Next the web is preferably drawn against the cutting table by application of vacuum to the underside of the web. The table is then preferably moved with the web positioned on the table to a blank-cutting position.

At the blank-cutting position a circular blank is preferably cut from a web of the heat-setable synthetic fabric material.

The blank is then positioned on one side of a circularly apertured die of diameter substantially less than the blank and defining a desired diameter of a circular bottom of the pot cover to be fabricated.

A central portion of the blank is then forced partly through the die aperture. During this forcing, radially inward movement of the circular periphery of the blank is frictionally restrained along an annular surface of the die surrounding the aperture. The central portion of the blank is forced through the die aperture in order to contact a circular central portion of the blank against the stop surface which is parallel with the aperture thereby forming ruffles in an annular portion of the blank surrounding the circular central portion. This occurs as the blank periphery, being of larger diameter than the die aperture, folding folds and converges to follow the blank central portion through the die aperture.

Next heat is preferably applied to the blank at least in the neighborhood where the blank transitions from the bottom portion to the side portion and where the side portion transitions to the lip. The heat preferably is applied for sufficient time to set the web material into the desired shape of the pot.

Radially inwardly circumferential biases are preferably applied to the now-ruffled blank preferably at a position proximate what will be the vertical extremity of the pot wall, proximate the transition of the pot wall to the lip during the application of heat thereto.

Finally, the circular central portion of the blank is preferably retained against the central stop surface preferably until the heat produces a permanent set in the fabric blank and the blank conforms to the desired pot or pot cover shape.

The method may further preferably encompass applying heat to the entire wall portion or to just a part of the wall portion, to set the pleats in place.

The method of fabrication may further comprise urging only the upper portion of the wall radially inward as the heat is applied.

In practicing the process for manufacture of the flower pot, blank cutting may be performed using a circular cutting knife or may be performed using a circumferential male cutting die.

Ideally, the surface against which the central portion of the blank is urged is a planar surface.

In the finished flower pot cover, the overlapping ruffles work to provide additional structural integrity to maintain the preformed shape of the flower pot cover. While open cup 44 adds to the structural integrity of the flower pot cover, open cup 44 is not necessary in order for the flower pot cover to retain its aesthetically pleasing shape. The heat application to the material from which the flower pot cover, particularly the cylindrical side portion 14 and the annular lip portion 18, is fabricated, produces essentially permanent fixing of the pleats in the flower pot cover material.

While it is desired that the flower pot cover be constructed of a single layer of material, it may also be constructed of a plurality of layers of the same or different types of material. The material may be of any thickness so long as it has sufficient rigidity and resistance to bending and has heat-setablity to form the ruffles during the manufacturing process and retain the ruffles thereafter as described above.

While the preferred embodiment of the flower pot cover has been described as set-forth above with reference to FIGS. 1 through 5 which illustrate the embodiment of the flower pot cover in which the fabric material has a sheen finish on its outer surface, the flower pot cover may equally well be fabricated according to the embodiments illustrated in FIGS. 6 through 10, which do not differ materially from the embodiments illustrated in FIGS. 1 through 5 except for the character of the finish on the outer surface of the flower pot cover material.

FIGS. 11 through 16 have been provided to illustrate in even greater detail the manner in which the ruffles, specifically ruffles 16I and 20I fold and overlap one another to provide the pleasing aesthetic appearance to the flower pot cover and to provide additional structural rigidity.

While the preferred embodiments of the invention have been described above and alternative embodiments have also been described, the scope of protection to which the invention is believed entitled is defined by the claims and by equivalents thereto which perform substantially the same function in substantially the same way to achieve substantially the same result as set forth in the claims, so long as such substantial equivalents, as defined by a claim for such substantial equivalent, do not read on the prior art.

What is claimed is:

1. A flower pot cover of single circular sheet construction comprising:

a. a circular planar bottom;

b. an outwardly bowed generally cylindrical side portion upstanding from said bottom about the periphery thereof, said side portion being loosely folded over and against itself to form a circumferentially continuous series of randomly shaped rolled, non-planar vertically elongated ruffles presenting a curved and bowed outwardly facing surface along said cylindrical side portion and extending generally parallel with an axis of said cylinder and forming rolls bowing outwardly proximate the vertical midpoint thereof to provide greater pot cover diameter proximate the vertical midpoint of said side portion than at upper and lower circular extremities of said side portion;

c. an annular lip having a circular outer periphery and extending angularly outwardly and upwardly from said cylindrical side portion about the upper extremity thereof, said annular lip being loosely folded and curled against itself to form a circumferentially continuous series of randomly shaped rolled, non-planar generally vertically and outwardly extending longitudinally elongated transversely curved ruffles presenting curved and bowed upwardly and downwardly facing annular lip surfaces.

* * * * *

UNITED STATES PATENT AND TRADEMARK OFFICE

CERTIFICATE OF CORRECTION

PATENT NO. : 6,115,961

DATED : September 12, 2000

INVENTOR(S) : Scott Shea

It is certified that error appears in the above-identified patent and that said Letters Patent is hereby corrected as shown below:

Column 4, line 59, replace "erring" with –Referring–.

In Figures 1 through 16, add the reference numerals as indicated on the attached sheets.

Signed and Sealed this

Twenty-second Day of May, 2001

Attest:

Nicholas P. Godici

NICHOLAS P. GODICI

*Attesting Officer* *Acting Director of the United States Patent and Trademark Office*